(12) United States Patent
Kuo et al.

(10) Patent No.: US 6,370,208 B1
(45) Date of Patent: Apr. 9, 2002

(54) CORRELATOR FOR CDMA APPLICATIONS

(75) Inventors: Fu-Yen Kuo, Hsin Chu; Chung-Wei Ku, Yungho, both of (TW)

(73) Assignee: Industrial Technical Research Institute (TW)

( * ) Notice: Subject to any disclaimer, the term of this patent is extended or adjusted under 35 U.S.C. 154(b) by 0 days.

(21) Appl. No.: 09/258,811

(22) Filed: Feb. 26, 1999

(51) Int. Cl.[7] .............................. H03D 1/00; H04L 27/06
(52) U.S. Cl. ..................... 375/343; 375/150; 708/426
(58) Field of Search ................. 375/343, 142, 375/143, 150, 152; 708/422, 423, 424, 426

(56) References Cited

U.S. PATENT DOCUMENTS 5,483,243 A * 1/1996 Gramlich et al. ............ 342/189
5,901,189 A * 5/1999 Rose ........................... 375/368
6,005,899 A * 12/1999 Khayrallah .................. 375/343

OTHER PUBLICATIONS

Andrew J. Viterbi, "Spread Spectrum Communications –Myths and Realities", IEEE Communications Magazine, pp. 11–18, (May 1979).

Erik Dahlman et al., "Wide–band services in a DS–CDMA based FPLMTS system", IEEE, pp.1656–1660, (May 1996).

Tomohiro Dohi et al.,"Experiments on Coherent Multicode DS–CDMA", IEEE, pp. –889–893, (May, 1996) .

Ian O. O'Donnell, "The Matched–Filter Correlator", Low –Power CMOS Wireless Communications, A Wideband CDMA System Design, Academic Press, pp. 245–253.

Branislav M. Popovic, "Efficient Despreaders for Multi –Code CDMA Systems", IEEE, pp. 516–520, (Apr., 1997).

Jinkang Zhu et al., "Principle and Performance of Variable Rate Multi–code CDMA Method", IEEE, ) pp. 256–259, (Apr., 1995).

* cited by examiner

Primary Examiner—Chi Pham
Assistant Examiner—Phuong Phu
(74) Attorney, Agent, or Firm—Finnegan, Henderson, Farabow, Garrett & Dunner, L.L.P.

(57) ABSTRACT

Correlators categorize different combinations of code sequences and identify locations for which code elements for the code sequences are equivalent. Then, a dispreading operation is performed once for each equivalent combination. The equivalent combinations, for example, may be locations where the code elements are the same or locations where code elements are complements of one another.

24 Claims, 2 Drawing Sheets

CORRELATOR FOR CDMA APPLICATIONS

RELATED APPLICATIONS

This application relates to an application by the same inventors entitled "Methods and Apparatus to Despread Dual Codes for CDMA Systems," filed on the same date as this application.

BACKGROUND OF THE INVENTION

This invention relates generally to single code and multi-code receivers, and more particularly to CDMA receivers having correlators to detect received CDMA signals.

The growing importance of wireless communication has increased the demand for data transmission over mobile radio channels. Although GSM standards have become very popular and data service specifications are developing, most current mobile communications still use CDMA technologies. Future multimedia transmission, however, will require wide bandwidths and high data rates, which in turn will require complex and expensive hardware.

CDMA systems use a pseudonoise (PN) sequence to "spread" input data to resist data loss in a noisy wireless environment. The transmitted baseband signal is expressed as $$S_T = \sum_i b_i[j]C_i, \qquad (1)$$

where $b_i[j]$, a scalar value representing the jth bit of user i, is +1 or −1, and $C_i$, a column vector representing the PN code sequence, also has values of +1 or −1. After the baseband signals are summed and transmitted, receivers despread the received signal back into an original input symbol by correlating the received signal and the same $C_i$ used to spread the signal PN code as follows:

$$b_k[k]=\text{sign}(C_k^T S_R). \qquad (2)$$

The sign function produces a "1" if the input is positive and a "−1" if the input is negative.

For example, assume that the transmitted signal can be represented as a series of elements as follows:

$$b[0]C_0+b[0]C_1+b[0]C_2+b[0]C_3+b[0]C_4+b[0]C_5 \qquad (3)$$

Normally, demodulating would involve "multiplying" that signal by the same code used for modulating the signal, adding the products, and then dividing the resulting sum by the total number of elements. For example, multiplying the above received signal (3) by the code used for modulating the signal yields:

$$b[0](C_0)^2+b[0](C_1)^2+b[0](C_2)^2+b[0](C_3)^2+b[0](C_4)^2+b[0](C_5)^2. \qquad (4)$$

Because $C_i$ equals +1 or −1, equation (4) becomes $$b[0]+b[0]+b[0]+b[0]+b[0]+b[0]=6b[0]. \qquad (5)$$

Dividing by the total number of elements in the modulating code, in this case six, yields the original signal b[0].

Third-generation mobile systems seek to support various types of new services requiring efficient transmission technologies, high bandwidth, and variable data rates. To meet these requirements, many system designers have considered Direct Sequence CDMA (DS-CDMA). Usually, correlators with a sign inverter and integrator are used to detect the user data at the receiver. The correlator output can be expressed by the following equation:

$$d_k = \sum_{n=0}^{N_c-1} (-1)^{c_{n+kN_c}} r_{n+kN_c} \qquad (6)$$

To reduce power consumption, some have proposed an alternative correlator architecture based on sign-magnitude representation of an input signal. This architecture involves dividing the summation into two terms to avoid sign change.

$$d_k = \sum_{n=0, c_{n+kN_c}=0}^{N_c-1} r_{n+kN_c} - \sum_{n=0, c_{n+kN_c}=1}^{N_c-1} r_{n+kN_c} \qquad (7)$$

A register stores the partial summation of each term. This design permits the use of a single adder because the evaluation of each term does not occur simultaneously.

Multi-code CDMA receivers require correlators with the same input signal but different codes. A similar technique divides the summation of correlator operation into several partial summation terms to reduce the complexity. Unfortunately, the required spreading factor in the limited bandwidth restricts the data rate for each CDMA code channel.

To address these concerns, some have used multi-code CDMA transmission to support a high bandwidth and variable data rate in a DS-CDMA system. Multi-code transmission splits a high-rate data stream into several parallel low-rate data streams and spreads them using different code sequences. Multi-code CDMA receivers use multiple parallel correlators to detect the parallel data streams.

When the modulating signal becomes very long, however, the complexity, whether measured by number of operations required in the demodulation or the amount of circuitry, becomes very high. Furthermore, the number of correlators can become significant when the receiver is also using a RAKE combining technique. For example, a wideband CDMA system supporting 2 Mbps over five CDMA code channels, requires forty correlators for a four-finger RAKE receiver and I/Q spreading. In such a high bandwidth case, correlator complexity dominates the system complexity.

Some researchers have proposed code sets to reduce the computational complexity of multi-code correlators. For example, a spreading code sequence using a Walsh code structure spread by a PN code can use a fast Hadamard transform (FHT). In such systems, the multi-code CDMA signal is first despread using the PN code and then an FHT is used to correlate the signal. These systems, however, limit the code size to the number of available Walsh codes. Furthermore, correlation operations for all Walsh codes must be done simultaneously, requiring calculation of the full FHT even when only partial results are needed.

Other schemes using dual gold codes have been proposed with some decrease in complexity and increase in flexibility. Unfortunately, the restrictions on code sets and full correlation operations still exist in these schemes.

DISCLOSURE OF THE INVENTION

A method consistent with this invention of demodulating an encoded signal comprises forming groups of code elements having one of a predetermined set of values, the groups of code elements representing a code used to encode the signal;

identifying locations for which a corresponding set of element values for all the codes are equivalent;

aggregating the portions of the signal at the locations identified as having equivalent element values; and performing correlation functions on the aggregated portions to demodulate the signal.

Another method consistent with this invention of demodulating a signal encoded with a modulation code, the demodulation using subcodes of code elements at sequential locations, each of the elements having one of a predetermined set of values and the subcodes collectively constituting the modulation code, comprises identifying locations for which a corresponding set of element values for all the subcodes are equivalent; aggregating the portions of the signal at the locations identified as having equivalent element values; and performing correlation functions on the aggregated portions to demodulate the signal.

Yet another method consistent with this invention of demodulating a signal encoded with a multiple modulation codes of code elements at sequential locations, each of the elements having one of a predetermined set of values, comprises identifying locations for which a corresponding set of element values for all the codes are equivalent; aggregating the portions of the signal at the locations identified as having equivalent element values; and performing correlation functions on the aggregated portions to demodulate the signal.

A system consistent with this invention demodulates an encoded signal using groups of code elements having one of a predetermined set of values, the groups of code elements representing a code used to encode the signal The system comprises means for aggregating portions of the signal at locations for which a corresponding set of elements of the groups of codes is equivalent; and means for correlating the aggregated portions to demodulate the signal.

Both the foregoing general description and the following detailed description are exemplary and explanatory only and do not restrict the invention claimed. The accompanying drawings, which are incorporated in and constitute a part of this specification, illustrate some systems and methods consistent with the invention and, together with the description, explain the principles of the invention.

DETAILED DESCRIPTION OF THE PREFERRED EMBODIMENTS

A. Principles of Operation

Figure 1:
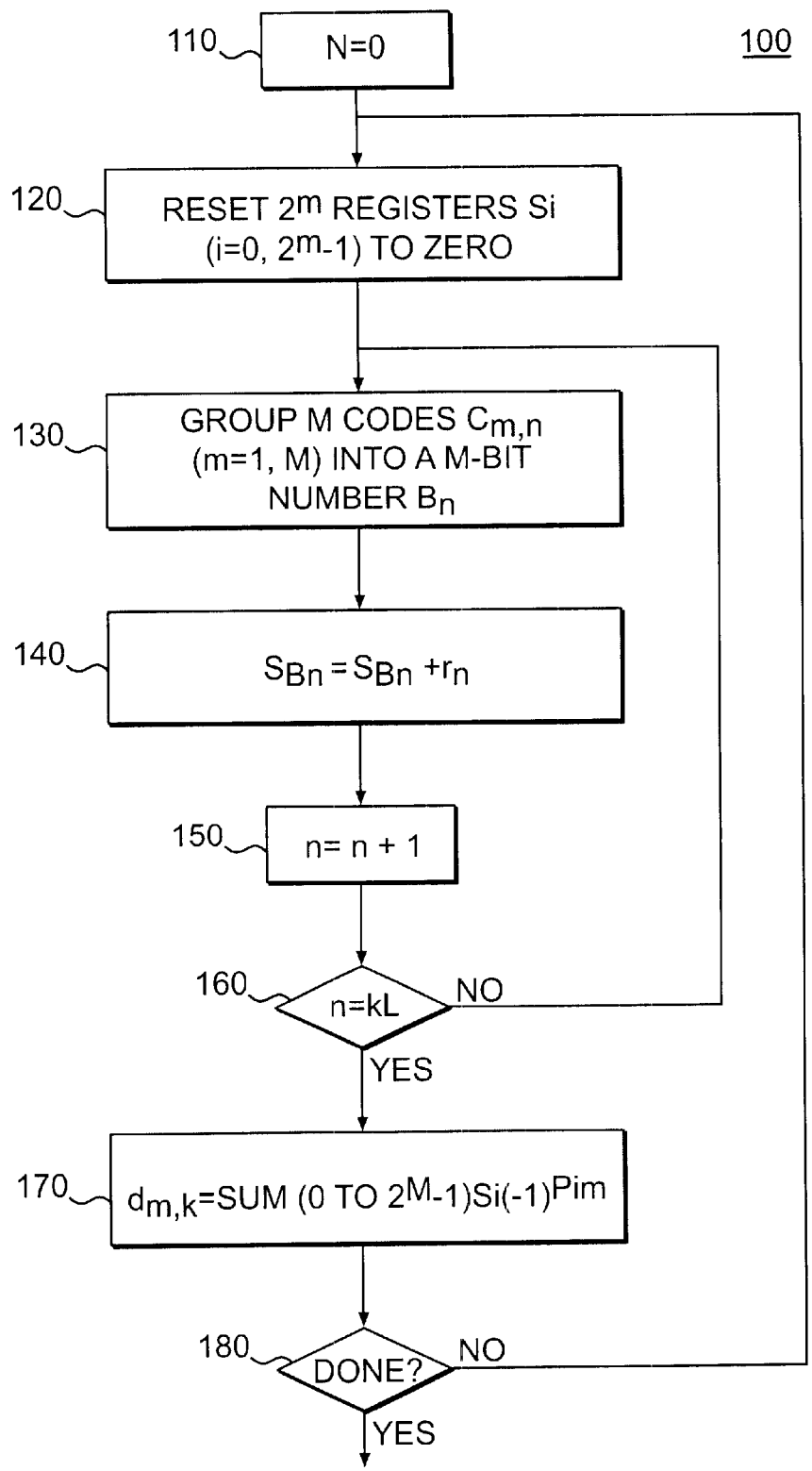
FIG. 1 is a flowchart showing a procedure consistent with the present invention.

Systems and methods consistent with the present invention can apply to both single-code and multi-code CDMA correlators. Single code correlators use one code divided into several subcodes. Multi-code correlators simultaneously demodulate a received signal composed of several spread signals each modulated by a different code.

Systems and methods consistent with this invention categorize different combinations of code sequences, which allow certain correlation operations to take place once for each combination. Single-code CDMA correlators effectively divide pseudonoise codes into several subcodes. For example, the following sixteen-element PN code 1,1,1,−1,1,−1,1,−1,−1,−1,−1,1,1,1,1,−1 can be divided into the following four subcodes $C_0$: 1, 1, 1, −1

$C_1$: 1, −1, 1, −1

$C_2$: −1, −1, −1, 1

$C_3$: 1, 1, 1, −1

Multi-code correlators would extract elements from each spreading code that have the same index. Thus for example, if there were four spreading codes of length 16 as follows:

$C_{1,0}$ $C_{1,1}$ $C_{1,2}$ ... $C_{1,15}$ $C_{2,0}$ $C_{2,1}$ $C_{2,2}$ ... $C_{2,15}$ $C_{3,0}$ $C_{3,1}$ $C_{3,2}$ ... $C_{3,15}$ $C_{4,0}$ $C_{4,1}$ $C_{4,2}$ ... $C_{4,15}$ the codes could be $C_0$: $C_{1,0}$ $C_{2,0}$ $C_{3,0}$ $C_{4,0}$ $C_1$: $C_{1,1}$ $C_{2,1}$ $C_{3,1}$ $C_{4,1}$ $C_2$: $C_{1,2}$ $C_{2,2}$ $C_{3,2}$ $C_{4,2}$

...

$C_{15}$: $C_{1,15}$ $C_{2,15}$ $C_{3,15}$ $C_{4,15}$

Normally, each of these code, or subcodes, would be multiplied by the corresponding portions of the received signal. Such operations require m×n multiplications, where m is the number of codes or subcodes and n is the number of elements in each code or subcode, and a like number of additions to tally the products.

Systems and methods consistent with the present invention, however, take advantage of the property that at several locations the sets of values of the codes or subcodes are the same. For example, the first and third positions have the pattern 1,1,−1,1. Adding the corresponding portions of the received signal together before multiplying reduces the number of multiplications. There are $2^m$ different patterns for m codes or subcodes, so at most only $2^m$ multiplication operations need take place.

The number of multiplications can be reduced even further by recognizing that each pattern has a complementary pattern. The first and fourth locations have complementary patterns (1, −1,1, −1 and −1,1, −1,1), and can be combined by adding the negative of one pattern (i. e., subtracting). By combining the results from the first and third positions with the complement of the results from fourth location, and doing so for other such pairs, further reduces the number of multiplications to $2^{m-1}$, yielding significant savings in complexity.

For multi-code CDMA applications, systems and methods consistent with this invention allow designers to reduce the complexity of correlators without restricting the number of code sets. Such systems and methods maintain flexibility for better code design and a wide range of applications without reducing performance. By first performing partial sums of the input sequence values corresponding to common groups, and then performing mathematical operations (addition or subtraction) on those sums, designers can create correlators with less hardware than conventional designs.

Moreover, because the code combinations are mutually exclusive, correlators consistent with this invention can use one core adder at the input sample rate for partial summation. As an added benefit, partial summation reduces the dynamic range of summation results, which in turn allows a smaller core adder.

The following description concentrates on multi-code CDMA correlators. Persons of ordinary skill, however, will be able to apply the principles to single-code correlators as well.

Generally, systems and methods consistent with this invention divide the required summations for each correlator into common partial summation terms. The ability to derive correlator outputs for multiple codes from these terms allows redundant computations to be eliminated.

Assume that the system uses M binary PN codes, $C_1, \ldots C_m$, with spreading factor L for multi-code CDMA transmission, where $C_m = (C_{m,1} \ldots C_{m,L})$. Each correlator output $d_m$ corresponding to input signal $x_n$ is:

$$d_m = \sum_n (-1)^{c_{m,n}} x_n \quad (8)$$

$B_n = (C_{1,n}, \ldots C_{M,n})$ is defined as the bit matrix with the $n^{th}$ binary elements of the M PN codes that define the bit presentation matrix $P_i$, the M-bit binary representation of the number i, e.g., $P_0 = (0, 0, \ldots 0)_m$, $P_1 = (0, 0, \ldots 1)_M$, and $P_{2^M-1} = (1, 1, \ldots 1)_M$. Similarly, $P_{i,j}$ is defined as the $j^{th}$ binary element of $P_i$. Accordingly, then $d_m$ can be written as:

$$d_m = \sum_{n=0, c_{m,n}=0}^{L-1} X_n - \sum_{n=0, c_{m,n}=1}^{L-1} X_n \quad (9)$$

If $$S_i = \sum_{n=0, B_n=P_i}^{L-1} x_n$$

is defined as the $i^{th}$ partial summation term for M multi-code correlation outputs $d_m$, then $$d_m = \sum_{i=0, P_{i,m}=0}^{2^M-1} S_i - \sum_{i=0, P_{i,m}=1}^{2^M-1} S_i \quad (10)$$

Equation 10 shows how $2^M$ partial summation terms derive correlation outputs. Specifically, the correlation output of $m^{th}$ code results from adding or subtracting all the terms, as indicated by the value of $P_{i,m}$. As explained above, the number of partial summation terms can be further cut in half from $2^M$ to $2^{M-1}$, because $S_i$ and $S_{2^m-i-1}$ are additive complements of each other, so they can be merged and evaluated as $S_i - S_{2^m-i-1}$.

B. Methods of Operation

FIG. 1 is a flowchart of a procedure 100 consistent with the present invention for a multi-code correlator. Operations are similar for a single-code correlator, with the codes being replaced by subcodes.

To begin with, a counter, n, is set to 0 (Step 110) Next, $2^M$ registers are reset to 0 (step 120), where M is the number of codes. The M codes are grouped into an M-bit number $B_n$ (step 130).

Next, the contents of the corresponding register are increased by the corresponding value of the input signal (step 140). The value n is incremented by 1 (step 150) and compared to the value kL (step 160). L represents the code length.

If n does not equal kL, the process repeats with the next code. Otherwise, the kth correlation result is obtained by adding the contents of the registers and adjusting for their signs (step 170). If all the correlation results are calculated the process is over. Otherwise, the registers are reset (step 120) and the next correlation result is determined.

C. Receiver Design

Figure 2:
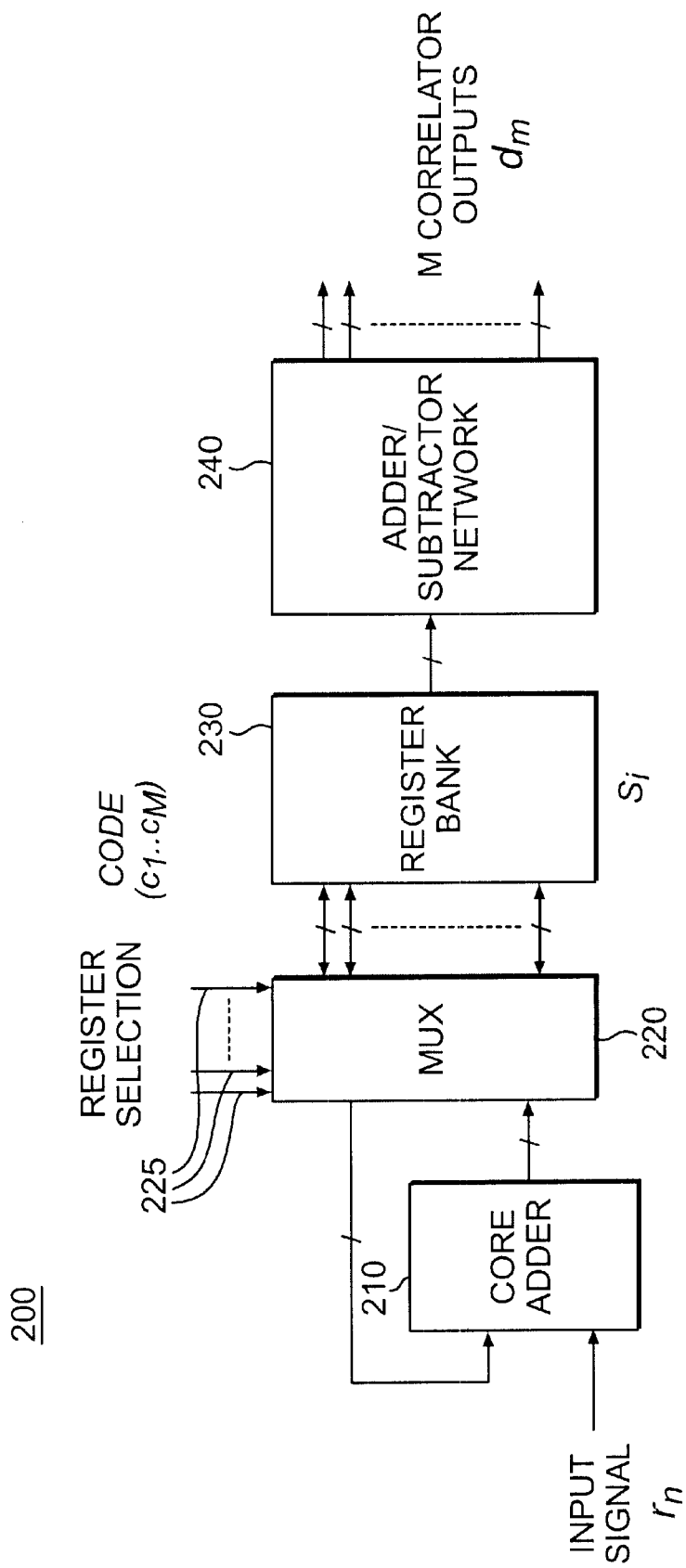
FIG. 2 is a block diagram of a correlator 200 consistent with the present invention.

FIG. 2 shows a correlator 200 consistent with the present invention. Core adder 210 in correlator 200 calculates partial sums of the input signals and the contents of the registers in register bank 230 selected by multiplexer 220 under control of multiplexer signal 225. Register bank 230 has $2^m$ or $2^{m-1}$ registers, depending upon whether the additive complements are combined as well. Multiplexer 220 also routes the output of adder 210 to the register indicated by signal 225 to store a new partial result in that register. Adder/subtractor network 240 computes the correlator outputs from the partial results in the register bank 230.

For example, for M=3, multiplexer 220 would be a 3-bit multiplexer, and register bank 230 would have eight registers. An example of the operation of such a system appears below:

| Input | $x_0$ | $x_1$ | $x_2$ | $x_3$ | $x_4$ | $x_5$ | $x_6$ | $x_7$ |
|---|---|---|---|---|---|---|---|---|
| Code 1 | 1 | 1 | 0 | 0 | 1 | 0 | 1 | 0 |
| Code 2 | 1 | 0 | 1 | 0 | 0 | 1 | 1 | 0 |
| Code 3 | 0 | 1 | 1 | 1 | 0 | 0 | 0 | 0 |
| Group No. | 6 | 5 | 3 | 1 | 4 | 5 | 6 | 0 |
| Reduced Group No. | 1 | 2 | 3 | 1 | 3 | 2 | 1 | 0 |

The reduced partial sum results are:

$s_0 = x_7$ $s_1 = -x_0 + x_3 - x_6$ $s_2 = -x_1 + x_5$ $s_3 = x_2 - x_4$.

The correlator outputs are as follows:

$C_1 = s_0 + s_1 + s_2 + s_3$ $C_2 = s_0 + s_1 - s_2 - s_3$ $C_3 = s_0 - s_1 + s_2 - s_3$.

To obtain the correlation outputs for the three codes, data stored in eight registers are summed with the appropriate sign inversion. The computation of correlation outputs is similar to correlating eight partial terms with three codes of length 8.

D. Complexity and Optimization

To implement an M-code correlator with code length L, a traditional correlator architecture requires M*L add/subtraction operations to derive one correlation output for each code. The correlator design described in FIG. 2 requires L add operations to obtain $2^M$ partial summation results and an additional $2^M$ add operations to obtain correlation results for a code. As explained above, the number of add operations can be reduced to $2^{M-1}$ because pairs of partial summation results can be merged into one term. This reduces the number of add operations to $L + M*2^{M-1}$.

If the complexity ratio of the proposed architecture, R, equals $(L + M*2^{M-1})/M*L$, Table 1 shows the complexity ratio of a code of length 256 for different values of M.

TABLE 1

Complexity ratio of code length 256 for different values M

| M | 2 | 3 | 4 | 5 | 6 | 7 | 8 | 9 |
|---|---|---|---|---|---|---|---|---|
| Complexity Ratio | 50.8% | 34.9% | 28.1% | 26.3% | 29.2% | 39.9% | 62.5% | 111.1% |

The optimum complexity ratio occurs when M=5.

Performance of the architecture is bounded due to the exponential growth of partial summation terms. When M is large, the number of terms is significant in comparison with the code length. Add operations required for correlator outputs dominate the complexity thus degrading performance. The optimum complexity ratio $R_{opt} \cong (M+1)/M^2$ for a given code length L occurs when $M^2 * 2M^{M-1} = L$. Thus the complexity is greatly reduced when code length is long, and is optimum when M is large.

The complexity ratio degrades when the number of codes exceeds $M_{opt}$, although the complexity ratio can be improved for a large number of codes by using two or more multi-code correlators. For example, for the M-code correlation using $M_a * M_b$-code correlators, where $M = M_a * M_b$, the complexity ratio is $R = (L + M_b * 2^{M_b - 1})/M_b * L$, which is independent of $M_a$. Therefore, for a large M, using the optimum $M_b$ for a given code length L will provide the optimum complexity ratio. In general, systems and methods consistent with this invention can reduce the computational complexity more than about a half without restricting the structure of spreading codes.

E. Conclusion

The specific hardware used to implement the correlators is not critical to this invention. Persons of ordinary skill in the art will know to use whatever technologies or circuit designs are appropriate for their particular needs while still taking advantage of the savings attendant the present invention. Therefore, the scope of the appended claims is not to be limited to these specific examples.

What is claimed is:

1. A method of demodulating an encoded signal comprising:
    forming groups of code elements, each code element having one of a predetermined set of values, the groups of code elements representing a code used to encode the signal;
    identifying locations for which a corresponding set of element values for all the codes elements are equivalent;
    aggregating portions of the signal at the locations identified as having equivalent element values; and
    performing correlation functions on the aggregated portions to demodulate the signal.

2. The method of claim 1, wherein the signal is encoded with a single modulation code, and wherein forming groups includes
    dividing the modulation code into subcodes.

3. The method of claim 1, wherein the signal is encoded with multiple modulation codes, and wherein forming groups includes
    selecting corresponding elements from each of the modulation codes.

4. The method of claim 1, wherein identifying locations includes
    identifying locations with the same set of element values, and
    wherein aggregating includes
    adding the portions of the signal at the locations identified as having the same set of values.

5. The method of claim 4, wherein identifying locations includes
    identifying locations with a complementary set of element values, and
    wherein aggregating includes
    subtracting the portions of the signal at the locations identified as having the complementary set of values.

6. The method of claim 1, wherein performing correlation functions includes adding and subtracting the aggregated portions.

7. A method of demodulating a signal encoded with a modulation code, the demodulation using subcodes of code elements at sequential locations, each of the elements having one of a predetermined set of values and the subcodes collectively constituting the modulation code, the method comprising:
    identifying locations for which a corresponding set of element values for all the subcodes are equivalent;
    aggregating portions of the signal at the locations identified as having equivalent element values; and
    performing correlation functions on the aggregated portions to demodulate the signal.

8. The method of claim 7, wherein identifying locations includes
    identifying locations with the same set of element values, and
    wherein aggregating includes
    adding the portions of the signal at the locations identified as having the same set of values.

9. The method of claim 8, wherein identifying locations includes
    identifying locations with a complementary set of element values, and
    wherein aggregating includes
    subtracting the portions of the signal at the locations identified as having the complementary set of values.

10. The method of claim 7, wherein performing correlation functions includes adding and subtracting the aggregated portions.

11. A method of demodulating a signal encoded with a multiple modulation codes of code elements at sequential locations, each of the elements having one of a predetermined set of values, the method comprising:
    identifying locations for which a corresponding set of element values for all the codes are equivalent;
    aggregating portions of the signal at the locations identified as having equivalent element values; and
    performing correlation functions on the aggregated portions to demodulate the signal.

12. The method of claim 11, wherein identifying locations includes
    identifying locations with the same set of element values, and wherein aggregating includes
adding the portions of the signal at the locations identified as having the same set of values.

13. The method of claim 12, wherein identifying locations includes
identifying locations with a complementary set of element values, and
wherein aggregating includes
subtracting the portions of the signal at the locations identified as having the complementary set of values.

14. The method of claim 11, wherein performing correlation functions includes adding and subtracting the aggregated portions.

15. A system for demodulating an encoded signal using groups of code elements having one of a predetermined set of values, the groups of code elements representing a code used to encode the signal, the system comprising:
means for aggregating portions of the signal at locations for which a corresponding set of elements of the groups of codes is equivalent; and
means for correlating the aggregated portions to demodulate the signal.

16. The apparatus of claim 15, wherein the aggregating means includes
means for adding the portions of the signal at locations identified as having the same set of values.

17. The apparatus of claim 15, wherein the aggregating means includes
means for subtracting the portions of the signal at the locations identified as having the complementary set of values.

18. The apparatus of claim 15, wherein the correlating means includes
means for adding and subtracting the aggregated portions.

19. The apparatus of claim 15, wherein the means for aggregating includes an adder.

20. The apparatus of claim 15, wherein the means for aggregating includes a register bank.

21. The apparatus of claim 20, wherein the register bank has $2^M$ registers, where M is the number of groups.

22. The apparatus of claim 20, wherein the register bank has $2^{M-1}$ registers, where M is the number of groups.

23. The apparatus of claim 15, wherein the aggregating means includes a multiplexer responsive to a register selection signal.

24. The apparatus of claim 15, wherein the means for aggregating includes:
an adder coupled to receive the signal and a partial sum signal;
a register bank containing partial sum signals; and
a multiplexer, responsive to a register select signal, for routing a selected one of the partial sums from the register bank to the adder, and for routing the output of the adder to a register within the register bank from which the partial sum is selected.

* * * * *